United States Patent
Nakamoto et al.

(10) Patent No.: US 6,456,466 B1
(45) Date of Patent: Sep. 24, 2002

(54) MAGNETIC HEAD WITH SHIELD LAYER HAVING DISCONTINUOUS MULTI-LAYER OR MIXED LAYER AND MAGNETIC RECORDING APPARATUS UTILIZING THE MAGNETIC HEAD

(75) Inventors: Kazuhiro Nakamoto, Odawara (JP); Hiroyuki Hoshiya, Odawara (JP); Takashi Kawabe, Hitachi (JP); Hiromasa Takahashi, Hachioji (JP); Hisashi Kimura, Odawara (JP); Katsuro Watanabe, Odawara (JP); Chiaki Ishikawa, Kokubunji (JP); Kaori Totsuka, Mitaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/531,466

(22) Filed: Mar. 20, 2000

(30) Foreign Application Priority Data

Jun. 9, 1999 (JP) .............................. 11-162040

(51) Int. Cl.$^7$ ................................ G11B 5/127
(52) U.S. Cl. ....................................... 360/319
(58) Field of Search ........................................ 360/319

(56) References Cited

U.S. PATENT DOCUMENTS 6,134,079 A * 10/2000 Koshikawa ................. 360/126

* cited by examiner

*Primary Examiner*—David Davis
(74) *Attorney, Agent, or Firm*—Antonelli, Terry, Stout & Kraus, LLP

(57) ABSTRACT

The present invention is to realize a magnetic recording and reproducing apparatus in which even if a spacing between shields of a magnetic head is narrowed, a deterioration in characteristic caused by a short-circuiting between a magnetoresistive layer and a magnetic shield layer is prevented to provide a high recording density. The present invention comprises an upper shield layer 15, a lower shield layer 13, and a magnetoresistive layer 14 arranged therebetween. Further, there is provided a constitution in which one or both shield layers has (have) a high resistance layer comprising a mixed layer of ferromagnetic metal and an insulating material, or a discontinuous multi-layer having a plurality of ferromagnetic metal layers and a plurality of insulating material layers laminated alternately, to prevent a deterioration in characteristic caused by a short-circuiting.

14 Claims, 7 Drawing Sheets

DISCONTINUOUS MULTI-LAYER

MIXED LAYER

US 6,456,466 B1

MAGNETIC HEAD WITH SHIELD LAYER HAVING DISCONTINUOUS MULTI-LAYER OR MIXED LAYER AND MAGNETIC RECORDING APPARATUS UTILIZING THE MAGNETIC HEAD

BACKGROUND OF THE INVENTION

1. Field of the Invention

The present invention relates to a magnetic recording and reproducing apparatus having a high recording density. The invention further relates to a magnetic head allowed to stably provide such a magnetic recording and reproducing apparatus as described, and more particularly relates to a magnetic head having a reproducing head with a magnetoresistive layer arranged between a pair of magnetic shield layers.

2. Related Arts

The magnetic recording and reproducing apparatus such as a magnetic disk device comprises a medium for magnetically recording information; a magnetic head provided with a recording element and a reproducing element for recording or reproducing information on the medium; a recording and reproducing operation control circuit for reproducing information on the basis of an output signal from the magnetic head and recording information on the basis of a signal input; a mechanism for rotating or moving the medium; and a positioning mechanism for deciding a position of the recording and reproducing head relative to the medium.

A recording element constituting the magnetic head comprises a coil for generating magnetic flux; a pair of magnetic cores for collecting magnetic flux; and a recording gap arranged between a pair of magnetic cores for generating a magnetic field. The magnetic cores generally used include an alloy layer of nickel and iron such as $Ni_{80}Fe_{20}$ and $Fe_{55}Ni_{45}$, an alloy layer of cobalt base, or a layer having about two layers of them laminated. The thickness of each core is often set to 1 to 4 $\mu$m. The recording operation is performed by applying a magnetic field generated by conducting a recording current to the coil onto the medium.

A reproducing element constituting the magnetic head comprises a pair of magnetic shield layers, a magnetoresistive layer between the pair of magnetic shield layers and arranged spaced apart by a predetermined distance from each shield layer, and a pair of electrodes connected electrically to the magnetoresistive layer. The magnetoresistive layer can be classified roughly into an AMR layer (anisotropic magnetoresistive layer) utilizing the anisotropic magnetoresistance, and a GMR layer (giant mageto-resistive layer) utilizing the giant magnetoresistance. The AMR layer is composed of, for example, a $Ni_{80}Fe_{20}$ layer having a thickness ranging from from 5 to 30 nm or the like. The GMR layer is composed of a laminate layer comprising a first ferromagnetic layer having a thickness of approximately 2 to 10 nm of which magnetization direction is changed by a magnetic field leaking from the medium, a second ferromagnetic layer having a thickness of approximately 1 to 5 nm of which the magnetization direction is almost fixed, and a non-magnetic conductive layer whose thickness is approximately 1 to 4 nm inserted between the first ferromagnetic layer and the second ferromagnetic layer. The GMR layer can obtain a higher output even by a small magnetic field compared with the AMR layer. That is, since the GMR layer is more sensitive, it is advantageous for a higher recording density of the magnetic disk device. In the magnetic disk device, a change in electro- resistance of these magnetoresistive layers is detected as an output signal by applying a detecting current. A pair of magnetic shield layers are provided for detecting a change in magnetic field leaking from the medium with high resolution. Since the narrower the spacing between the pair of shield layers, the higher resolution is obtained. Therefore the spacing between the shields is being narrowed corresponding to the future higher recording density of the magnetic recording and playback apparatus. In addition, the magnetic shield layer has a function to release, outside, heat generated in the magnetoresistive layer by applying a detecting current. As the magnetic shield layer, an $Ni_{80}Fe_{20}$ layer, and an alloy layer with the former being a base are often used. Further, as the shield layer (lower shield layer) on the substrate side, sendust (Fe—Al—Si) and an alloy layer such as the amorphous of a cobalt base are sometimes used, in addition to those mentioned above. A thickness of each shield layer is generally set to 1 to 4 $\mu$m in thickness.

Where a magnetic head with the recording element and the reproducing element formed on the same substrate is used, one of the pare of magnetic cores of the recording element in the side near the reproducing element, that is, the lower core is also used as the upper shield layer of the reproducing element, in order to reduce a displaced width between a position of the write gap and a position of the masgnetoresistive layer. In case of a magnetic head in which the recording element and the reproducing element combined are unified, there is a case of employing a constitution in which for the purpose of suppressing noises during the reproducing operation, one non-magnetic layer such as alumina having a submicron thickness is inserted into the upper shield layer, and a ferromagnetic metal layer having 1 to a few $\mu$m in thickness, a non-magnetic layer having a submicron thickness, and a ferromagnetic metal layer having a thickness of 1 to a few $\mu$m are laminated sequentially.

Generally, the magnetic core of the recording element and the magnetic shield layer of the reproducing element are formed using a metal layer as a main component in any case. In this case, when the spacing of the shields is narrowed to cope with the higher density of the magnetic disk device, insulation between one or both shield layers and the magnetoresistive layer or an electrode connected to the magnetoresistive layer is often damaged due to electrostatic discharges or the like to increase a probability in which a considerable reduction in reproducing signal amplitude (the amplitude is often substantially zero) and an increase in noises occur, resulting in an erroneous operation of the magnetic disk device and the lowering of yield of the magnetic heads. The damage to the magnetic heads caused by electrostatic discharges is not limited to only the time when the magnetic heads are being fabricated. It is well known that for example, in the process in which a person comes in contact with the magnetic heads such as the work of incorporating the magnetic heads into the magnetic disk device, if the control of electrostatic discharge is not sufficient, there is the possibility of giving the damage to the magnetic heads. Further, even after the magnetic heads have been incorporated into the magnetic disk device, for example, when a charged-up person or the like comes in contact with a casing (often, an electric ground) of the magnetic disk device, a ground potential is varied to generate a potential difference in the magnetic heads, thus giving damages.

The electrostatic discharge damage to which the head is subjected can be considered roughly based on causes as follows. A first case is the case where an abnormal voltage is applied due to electrostatic discharge between a pair of electrodes connected to the magnetoresistive layer, in which case, the magnetoresistive layer is sometimes broken or fused due to heat generated by a current. A second case is the case where an abnormal voltage is applied due to electrostatic discharge between one or both of shield layers arranged with a magnetoresistive layer sandwiched and the magnetoresistive layer or an electrode(s) connected to the magnetoresistive layer, in which case, the magnetoresistive layer is sometimes broken or fused by discharge which occurs between the shield layers and the magnetoresistive layer or the electrode(s), and the shield layers and the magnetoresistive layer sometimes become short-circuited.

In any case, the magnetic head is not operated normally any longer. In particular, where the spacing of the shields is made narrower than 100 nm, the probability of giving the damage due to the discharge which occurs between the shield layers and the magnetoresistive layer or the electrodes increases rapidly. Therefore, settlement of this problem has been desired in view of the stable operation of the magnetic disk device and the enhancement of the yield of the magnetic heads.

As one method for solving the problem, for example, Japanese Patent Laid-Open No. 5-266437 proposes that an insulating magnetic layer (NiZn ferrite material is illustrated) is arranged on the surface of at least one magnetic shield layer on the magnetoresistive layer.

It is known that with respect to a magnetic thin film having a high electrical resistivity, for example, Co—Al—O and Fe—Si—O have a high electrical resistivity ranging from 10 to $10^5$ $\mu\Omega \cdot m$.

Further, Japanese Patent Application Laid-Open No. 11-86234 which corresponds to copending U.S. application Ser. No. 09/116,526, filed Jul. 16, 1998, or Japanese Patent Laid-Open No. 8-147634 describes that a continuous laminate layer of a ferromagnetic metal layer and an insulting material layer is used as a magnetic shield layer, or a layer of a ferromagnetic metal layer and an insulating compound layer is used.

SUMMARY OF THE INVENTION

It is therefore an object of the present invention to provide a recording and reproducing apparatus having a high stability, in which even where a space of shields is narrowed for higher recording density of a magnetic recording and reproducing apparatus, deterioration in characteristic caused by short-circuiting between a magnetoresistive layer and a magnetic shield layers is prevented, the magnetic recording and reproducing apparatus being reduced in erroneous operation.

It is a further object of the present invention to provide a high output magnetic head with high yield, without carrying out high temperature heat treatment, and to realize a magnetic recording and reproducing apparatus of high recording density.

For achieving the aforementioned objects, there is provided a magnetic head comprising a pair of magnetic shield layers, a magnetoresistive layer arranged between the pair of magnetic shield layers, and a pair of electrodes electrically connected to the magnetoresistive layer, at least one of the pair of magnetic shield layers comprising a discontinuous multi-layer formed by alternately laminating a plurality of ferromagnetic metal layers and a plurality of insulating material layers.

The discontinuous multi-layer constituting the magnetic shield layer can be optimized and thereby set so as to have sufficient permeability as a magnetic shield and electrically sufficient resistivity.

FIG. 11 shows a wave-form indicating of a relationship between distance x from the center between a pair of magnetic shields and magnetic field Hy in the case where permeability of a magnetic shield layer is changed as in 10, 100, 500. When the permeability of the magnetic shield layer is 10, the waveform is spread, and the shield effect is small. It is found that where the permeability of the magnetic shield layer is than 100 or more, the sufficient shield effect is obtained.

That is, since the width of the reproduced wave-form is kept narrow, the permeability is preferably 100 or more, desirably, not less than 500.

With respect to the electrical resistivity, the ratio between a current flowing through a GMR layer and a current flowing through a magnetic shield layer is determined by the ratio between the electrical resistivity of the GMR layer and the electrical resistivity of the magnetic shield layer. With respect to the GMR layer, normally, the sum total of thicknesses of first and second ferromagnetic layers and a non-magnetic conductive layer affecting on the reproducing output is approximately 10 nm, a height (a) of an element (width depthwise from an air bearing surface) of the GMR layer is 0.2 $\mu$m, and a track width (b) is 0.3 $\mu$m. With respect to the magnetic shield layer, a thickness of the magnetic shield layer is 100 nm, a height of the magnetic shield layer in which part a current flows is about 10 times (2 $\mu$m) of the height (a) of an element of the GMR layer, and a width thereof is (0.3 $\mu$m) equal to a track width (b) of the GMR layer. From the foregoing, the volume ratio of GMR layer-:shield is 1:100 (10×a×b:100×10a×b). It is generally desired that even where insulation between the magnetic shield layer and the magnetoresistive layer or an electrode is broken, a current flowing through the magnetic shield layer be not more than $\frac{1}{10}$ of a current flowing through the magnetoresistive layer in order to prevent a detecting current from shunting to the magnetic shield layer. Accordingly, for making a current flowing through the magnetic shield layer having the volume 100 times of the GMR layer not more than $\frac{1}{10}$, the electrical resistivity of the magnetic shield layer should be made not less than 1000 times of that of the GMR layer. Therefore, the electrical resistivity of the magnetic shield layer is desired to be approximately 0.1 m$\Omega \cdot$m which is 1000 times of that of the magnetoresistive layer (approximately 0.2 $\mu\Omega \cdot$m to 0.3 $\mu\Omega \cdot$m) or more.

The discontinuous multi-layer sometimes has the aforementioned good characteristic by setting a thickness of each layer of the ferromagnetic metal layer and the insulating material layer to approximately 0.5 to 5 nm, though being different depending on the layer forming conditions. As shown in FIG. 2A, a thickness 611 of a ferromagnetic metal layer 61 is made to be not more than 5 nm whereby the ferromagnetic metal layer constitutes no continuous layer evenly spread in the direction of in-plane but is in the form of islands, and an insulating material 62 is formed so as to bury therebetween. As a result, a discontinuous multi-layer, in which each layer of both the ferromagnetic metal layer 61 and the insulating material layer 62 is discontinuous with keeping both layer in two-dimensional arrangement (layer structure) in a plane, can be obtained. By employing this structure, a layer being suitable for magnetic shield, which has high resistivity of 0.1 m$\Omega \cdot$m or more and keeps good permeability of 100 or more, is realized. On the other hand, by setting the thickness of ferromagnetic metal layer too thin, islands which is formed become small and it become difficult to magnetize the layer for external magnetic field by demagnetizing field, that is, its permeability become lower. In order to prevent this, the thickness of the ferromagnetic metal layer 611 is desired to be about 0.5nm or more. When the thickness of the insulating layer 621 is thick, a ratio of ferromagnetic metal layer becomes low in the whole multi-layer and the amount of saturation magnetization amount becomes low. As a result, its permeability becomes low. By setting the thickness of insulating material layer too thin, ferromagnetic metal layer 61 is not separated sufficiently and its resistivity becomes lower. The thickness of insulating material layer 621 is desired to be 0.5nm to about 5 nm to get sufficient permeability and resistivity. The most biggest difference between a continuous multi-layer and a discontinuous multi-layer is in its resistivity. In case of a continuous layer including thick ferromagnetic metal layer, the resistivity is in range of from 0.1 $\mu\Omega\cdot m$ to about 1 $\mu\Omega\cdot m$ which is nearly order of resistivity of its bulk material, or to at most 200 $\mu\Omega\cdot m$ (0.002 m$\Omega\cdot m$) which is shown in Japanese Patent Application Laid-Open No. 11-86234 or Japanese Patent Application Laid-Open No.8-147634. However high value of resistivity, which is beyond comparison as compared with a continuous multi-layer being 0.1 m$\Omega\cdot m$, can be obtained. Therefore, in view of resistivity, a discontinuous multi-layer is required in stead of a continuous multi-layer.

It is in need of low temperature process in which the temperature is in range of about 250°C. or less for forming a discontinuous multi-layer, in order to obtain a discontinuous multi-layer in which each layer of both the ferromagnetic metal layer 61 and the insulating material layer 62 is discontinuous with keeping both layer in two-dimensional arrangement(layer structure) in a plane. Because high temperature process in which a temperature is in such as 300°C. or more, causes disarrangement of each layer of both the ferromagnetic metal layer 61 and the insulating material layer 62. Therefore, in case of using a magnetic shield layer having a discontinuous multi-layer, thermal deterioration of GMR layer could be avoided, because it is no need to employ high temperature treatment in a manufacturing process. As a result, a magnetic recording and reproducing head having narrow spacing of shields and high output could constantly be obtained.

A mixed layer of ferromagnetic metal and insulating material can be also used as a magnetic shield. In case of employing the mixed layer, degree of freedom for combining ferromagnetic metal with insulating material is restricted as compared with a discontinuous multi-layer, because there is a trade-off relationship between resisitivity and permeability, that is, large amount of ferromagnetic metal causes increasing a permeability and decreasing a resisitibility, and on the other hand, large amount of insulating material causes increasing a resisitivity and decreasing a permeability.

It is useful to using a discontinuous multi-layer in order to get predetermined permeability and predetermined resisitibility.

In case of using a mixed layer as a magnetic shield layer, the above-said good characteristic can be obtained by setting the ratio of ferromagnetic metal and insulating material in range of from 1:2 to about 3:1. The mixed layer is a layer in condition of mixing of ferromagnetic metal and insulating material in three dimension, and of that both of ferromagnetic metal and insulating material are in a form of particle or ferromagnetic metal in a form of particle encloses insulating material, so that the mixed layer has a structure in which these particles are separated each other. In case of large content of ferromagnetic metal, particles of ferromagnetic metal are not fully separated, so that resistivity of this layer becomes low. In case of low content for ferromagnetic metal, amount of saturation magnetization becomes low, so that permeability of this layer becomes low. The above-said ratio of ferromagnetic metal and insulating material is preferable to satisfy both characteristics of resistivity of about 0.1 m$\Omega\cdot m$ and permeability of 100 or more.

In case of employing a discontinuous multi-layer in which a plurality of the above-said ferromagnetic metal layers and a plurality of the above-said insulating material layers are formed by laminating alternately, or a mixed layer of ferromagnetic metal and insulating material as a magnetic shield, it is preferable to employ layers as both of a lower shield layer being near a substrate and upper shield layer being near a recording element. However, of course, it can be used on only one side. In this case, it is preferable to employ the above-said shield layer as a shield layer being in contact with more thinner gap layer selected from a lower gap layer inserted between a magnetoresistive layer and a lower shield layer and an upper gap layer inserted between magnetoresistive layer and an upper shield layer. A gap layer often formed by insulating material, for example alumina or silicon oxide, because a thin gap layer has a higher possibility of breaking insulation than a thick gap layer. When thicknesses of both gap layers of upper and lower are approximately equal, it is preferable to apply the above-said shield layer to a shield layer on which an electrode is formed (it is often upper shield layer). Because thickness of a gap layer being between an electrode and a shield layer often thin, so that insulation is easily destroyed on this gap layer. Nickel based alloy can be also employed as ferromagnetic metal contained in the magnetic shield layer. Because it is difficult to make amount of saturation magnetization of Nickel based alloy in the same level of Cobalt based alloy or Iron based alloy, however it is comparatively easily to suppress coercivity low, so that high permeability can be obtained. $Ni_{80}Fe_{20}$ can be given as a main example. Amount of saturation magnetization of this alloy is about 1.0 Tesla, but coercivity is about 100 A/m and is sufficient low. And it is useful to that magnetostriction can be also suppressed sufficient low, that is in about $1\times10^{-7}$.

Insulation material contained in a magnetic shield layer can be used by selecting at least one element from a group of oxide, nitride, carbide, boride of Alumina or silicon, and boron nitride and by combining the above-said elements.

By selecting the above-said ferromagnetic metal and insulating material, high temperature treatment of over 300° C. in a process of forming a mixed layer is not needed. When forming a mixed layer, ferromagnetic metal or insulating material which do not require high temperature treatment have to be selected, because of preventing destroying magnetoresistive layer.

Therefore, high temperature treatment of over 300° C. in a process of forming a magnetic shield layer is not needed, so that GMR layer which is weak for in high temperature process but is high sensitive can be employed as a magnetoresistive layer.

Moreover, laminating thin layers of ferromagnetic metal and insulating material layer several times can be used to form a magnetic shield layer of several $\mu$m thickness, but this process is not always easily in industry. However making stacked numbers of a multi-layer smaller causes making a thickness of a magnetic shield layer thinner, so that efficiency of radiation of heat becomes low. In this case, combining a magnetic shield layer with another thick heat radiation layer is useful to stack layers, wherein the magnetic shield layer is comparatively thin, that is, by using ferromagnetic metal layer and insulation material layer, the magnetic shield layer is formed in small numbers of laminating layers. Moreover, in case of using mixed layer as a magnetic shield layer, stacking the magnetic shield layer and another heat radiation layer is useful to make an efficiency of radiation of heat higher.

Some materials having high heat conductivity(metal, semiconductor material) can be used as a heat radiation layer, and it is preferable to use soft magnetic metal which is usually used as a magnetic shield layer so far and to set thickness in range of from 1 $\mu$m to about several $\mu$m. For example, $Ni_{80}Fe_{20}$ layer, alloy layer which is based thereon, or sendust (Fe—Al—Si) and cobalt based amorphous material can be given as the above-said materials having high heat conductivity. Because when uniform and large external magnetic field is applied on a head, a thick heat radiation layer formed by a soft magnetic metal also is magnetized, (because magnetic flux flows into this layer), so that ,it is possible to prevent a relatively thin magnetic shield layer from being magnetically saturated. When a radiating layer is formed of metal, an insulating layer having a predetermined thickness can be inserted in order to prevent an electrical short-circuiting between the magnetic shield layer and the radiating layer. The thinner the thickness, the higher radiating efficiency is obtained, but the insulating property lowers. Preferably, the thickness is set so as to fulfill both of these, 10 to 500 nm.

Ferromagnetic metal contained in the magnetic shield layer can be an alloy of cobalt base or an alloy of iron base, because use is made of the alloy of cobalt base or the alloy of iron base having a high saturation magnetization amount to enhance the permeability of the shield layer. The aforesaid alloys can include nickel or copper in order to lower the coercivity force of the magnetic shield layer. As an influential example, there can be mentioned $Co_{90}Fe_{10}$. The saturation magnetization amount is as large as approximately 1.8 tesla, and the coercivity is as low as approximately several hundreds of A/m. When the magnetostriction of the shield layer is large, there sometimes occurs a problem of instability such as fluctuation of the reproducing waveform when a head is constituted. However, since the magnetostriction can be suppressed to be as low as $10^{-7}$ for such a case, which is advantageous.

DESCRIPTION OF THE PREFERRED EMBODIMENTS

Figure 1:
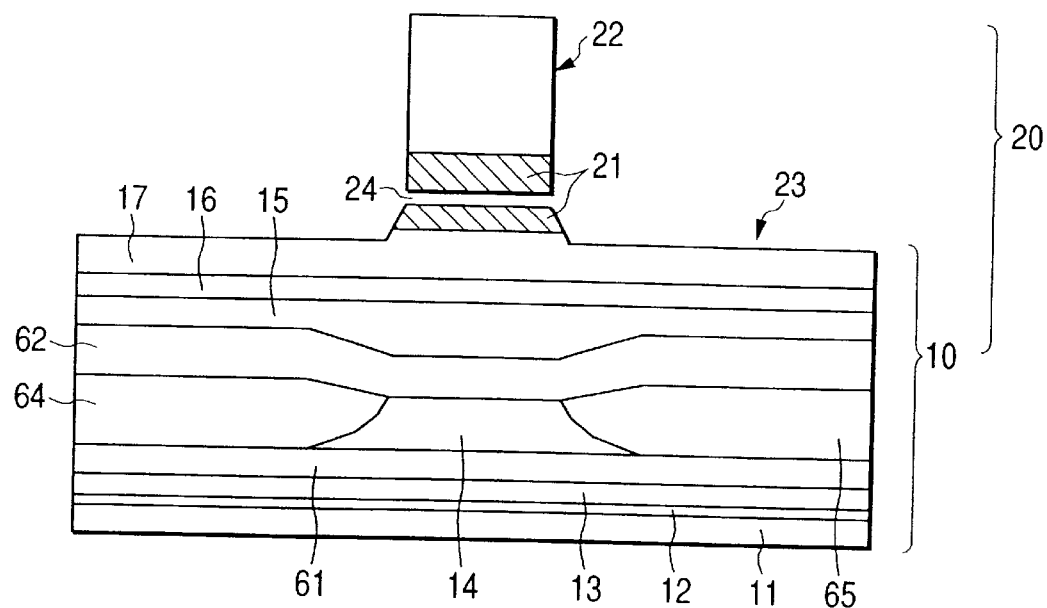
FIG. 1 is an air-bearing surface of a magnetic head according to Embodiment 1 of the present invention.

FIG. 1 is an air-bearing surface of a magnetic head according to Embodiment 1 of the present invention.

The present magnetic head is prepared by sequentially laminating reproducing element 10 and recording element 20 on a substrate. The reproducing element 10 comprises: a lower radiating layer 11 of 2 μm thickness formed of $Ni_{80}Fe_{20}$ formed on the substrate, an insulating layer 12 of 100 nm thickness formed of $Al_2O_3$ and $SiO_2$ laminated in contact with the lower radiating layer 11, a lower shield layer 13 comprising a discontinuous multi-layer of 100 nm thickness in which a Co90Fe10 layer of 1.5 nm thickness and a $Al_2O_3$ layer of 1 nm thickness are laminated alternately and laminated in contact with the insulating layer 12, a magnetoresistive layer 14 laminated on the lower shield layer 13, a pair of electrodes (not shown) electrically connected to the magnetoresistive layer 14, an upper shield layer 15 comprising a discontinuous multi-layer of 100 nm thickness in which a $Co_{90}Fe_{10}$ layer of 1.5 nm thickness and an $Al_2O_3$ layer of 1 nm thickness are laminated alternately and laminated on the magnetoresistive layer 14, an insulating layer 16 of 100 nm thickness formed of A1203 and $SiO_2$ laminated in contact with the upper shield layer 15, and an upper radiating layer 17 of 2 μm thickness formed of $Ni_{80}Fe_{20}$ laminated in contact with the insulating layer 16. A spacing of shields (a spacing between the upper shield layer 15 and the lower shield layer 13) for determining resolution in reproduction is 80 nm. A lower gap 61 and an upper gap 62 are formed between the lower shield layer 13 and the magnetoresistive layer 14 and between the upper shield layer 15 and the magnetoresistive layer 14, respectively. The upper gap 62 and the lower gap 61 serving as a reproducing gap are formed of an insulating layer comprising $Al_2O_3$ and $SiO_2$.

The recording element 20 comprises an upper core 22 composed of a laminate layer formed of $Ni_{80}Fe_{20}$ of 3μm thickness and a high saturation magnetic flux density layer 21 of 0.5 μm thickness, a lower core 23 composed of a laminate layer formed of the upper radiating layer 17 and the high saturation magnetic flux density layer 21 of 0.5μm thickness laminated in contact therewith, a recording gap 24 of 0.2 μm thickness comprising $Al_2O_3$ and $SiO_2$ between the upper and the lower cores 22 and 23, and a coil (not shown) for generating magnetic flux. For the high saturation magnetic flux density layer, $Fe_{55}Ni_{45}$ and $Co_{65}Fe_{25}Ni_{10}$ can be used, for example.

In the present embodiment, both the upper shield layer 15 and the lower shield layer 13 were formed in the procedure such that a discontinuous multi-layer in which a $Co_{90}Fe_{10}$ layer and an $Al_2O_3$ layer are laminated alternately is subjected to heat treatment in a magnetic field at 250° C.

Figure 2A:
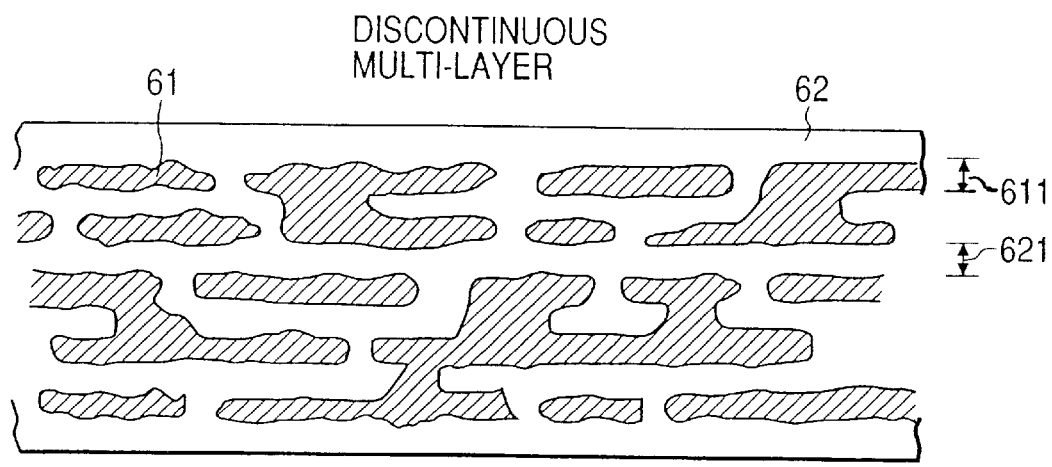
FIGS. 2A and 2B are schematic sectional views showing layer constitutions of a discontinuous multi-layer and a mixed layer included in a magnetic shield layer of a magnetic head according to the present invention.

FIG. 2A schematically shows the above state in section. The thickness of the $Co_{90}Fe_{10}$ layer as ferromagnetic metal was set to approximately 1.5 nm whereby the $Co_{90}Fe_{10}$ layer 61 is not a continuous layer evenly spread in the in-plane direction but is formed in the form of islands, and the $Al_2O_3$ layer 62 as insulating material is formed to bury therebetween. As a result, these layers could obtain a discontinuous multi-layer which is discontinuous in in-plane while keeping a two-dimensional arrangement (layer construction) of the in-plane. The resistivity of the present discontinuous multi-layer indicates a high value well above 0.1 mΩ·m and the permeability is approximately 300, which is a satisfactory value. While in this embodiment, the $Co_{90}Fe_{10}$ layer was used as an example of ferromagnetic metal, $Ni_{80}Fe_{20}$ can be used instead.

Figure 2B:
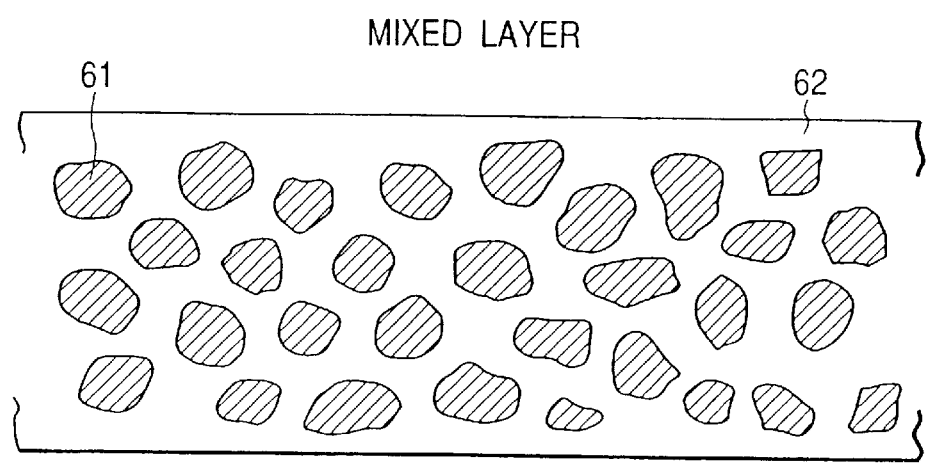

Further, each magnetic shield layer can be formed, for example, by a mixed layer of $Co_{90}Fe_{10}$ and $Al_2O_3$, a mixed layer of Fe and $SiO_2$, or a Co—Al—O layer. The mixed layer of $Co_{90}Fe_{10}$ and $Al_2O_3$ can be formed, for example, by simultaneously sputtering $Co_{90}Fe_{10}$ layer and an $Al_2O_3$. Also, the mixed layer of Fe and $SiO_2$ can be prepared by the procedure similar thereto. FIG. 2B schematically shows the state of the section of the mixed layer thus obtained. There can be realized the constitution in which the ferromagnetic metal 61 comprised of $Co_{90}Fe_{10}$ are diffused three-dimensionally in the form of particles, which are surrounded by the insulating material 62 comprised of $Al_2O_3$. The Co—Al—O layer can be obtained by sputtering Co and Al in the atmosphere of oxygen. Co and Al are deposited on the substrate while being oxidized to obtain a layer state similar to that of FIG. 2B.

Figure 3A:
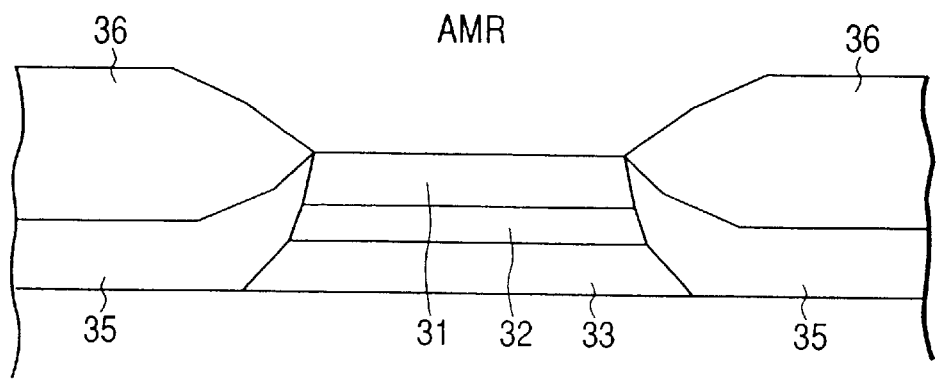
FIGS. 3A and 3B are views showing the neighborhood of a magnetoresistive layer in enlarged scale of the air-bearing surface of a magnetic head according to Embodiment 1 of the present invention.
Figure 3B:
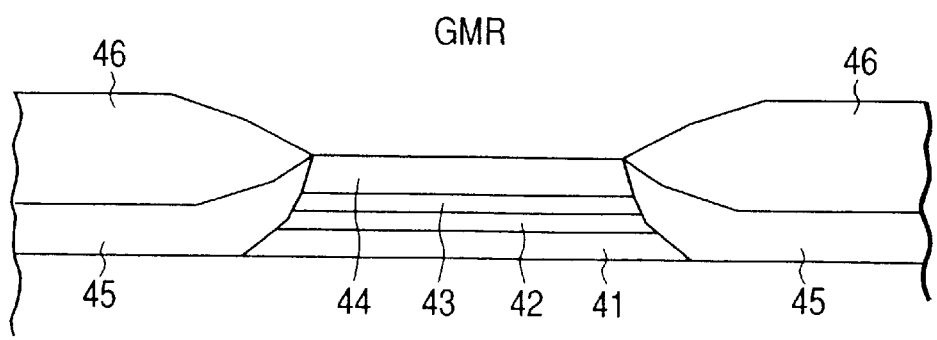

Any of an AMR layer, a GMR layer, or other layers indicative of magnetoresistive can be applied to the magnetoresistive layer 14. Examples for forming an element using an AMR layer or a GMR layer will be described. FIGS. 3A and 3B are enlarged views of neighborhood of the magnetoresistive layer 14 of an air-bearing surface in reproducing elements using the respective layers. Note that the upper and lower shield layers are not shown. The AMR element is prepared in such a manner that a laminate layer of an AMR layer 31 formed of $Ni_{80}Fe_{20}$ of 15 nm thickness, a separating layer 32 formed of Ta of 5 nm thickness, an a soft bias layer 33 formed of an NiFeCr layer of 15 nm thickness is collectively cut off both sides so as to have a predetermined width. On both sides are arranged magnetic domain control layers 35 comprising a CoPtCr layer and a Cr base layer in order to domain-control the AMR layer. The electrodes 36 electrically connected with the AMR layer 31 are laminated on the magnetic domain control layers 35.

The GMR element is prepared in such a manner that a GMR laminate layer comprising a first ferromagnetic layer 41 having an $Ni_{80}Fe_{20}$ layer of 2 nm thickness and a Co layer of 0.5 nm thickness laminated, a non-magnetic conductive layer 42 formed of Cu of 2 nm thickness, and a second ferromagnetic layer 43 having a Co layer of 2 nm thickness, a Ru layer of 0.8 nm thickness and a Co layer of 1 nm thickness laminated, and an anti-ferromagnetic layer 44 comprising a $Mn_{50}Pt_{50}$ layer of 10 nm thickness for fixing the magnetization direction of the second ferromagnetic layer 43 is collectively cut off both sides so as to have a predetermined width. A unidirectional magnetic anisotropy is added to the magnetization direction of the second ferromagnetic layer 43 by the anti-ferromagnetic layer 44 so that the magnetization direction indicates the air-bearing surface (paper surface). Similarly to the AMR element, the magnetic domain control layers 45 and the electrodes 46 are arranged on both sides of the GMR layer. While FIG. 3B shows a case where the anti-ferromagnetic layer 44 is arranged on the upper side, it is to be noted that the order of lamination of the GMR laminate layer may be inverted so that an anti-ferromagnetic layer, a second ferromagnetic layer, a non-magnetic conductive layer, and a first ferromagnetic layer are laminated sequentially from the substrate side. It is also possible to employ the constitution in which an anti-ferromagnetic layer, a second ferromagnetic layer, a non-magnetic conductive layer, a first ferromagnetic layer, non-magnetic conductive layer, a second ferromagnetic layer, and an anti-ferromagnetic layer are laminated sequentially.

Figure 4:
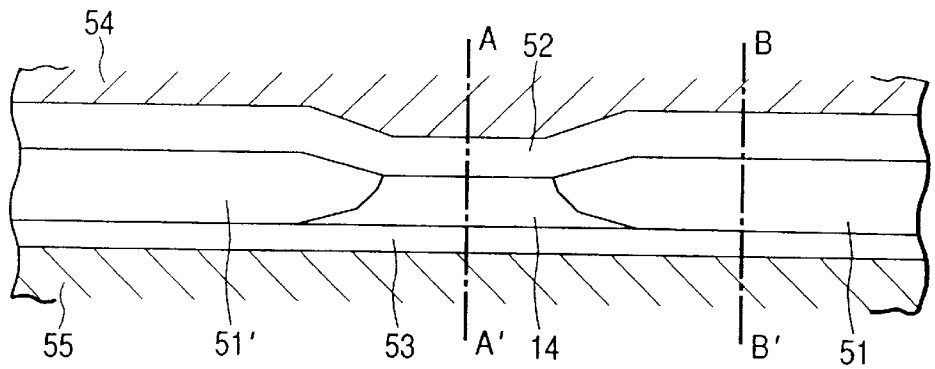
FIG. 4 is a view showing the neighborhood of a magnetoresistive layer in enlarged scale of an air-bearing surface of a conventional magnetic head.

Next, FIG. 4 shows that where a magnetic head having a metal shield layer is used, at which place the electrostatic discharge tends to occur. FIG. 4 is a view showing the neighborhood of a magnetoresistive layer in enlarged scale of an air-bearing of a conventional magnetic head. A pair of electrodes 51, 51' is connected to the magnetoresistive layer 14, and are arranged at positions of a predetermined distance apart from an upper shield layer 54 and a lower shield layer 55. An upper gap layer 52 and a lower gap layer 53 are inserted between the magnetoresistive layer 14 and the upper shield layer 54 and between the magnetoresistive layer 14 and the lower shield layer 55, respectively. Each gap layer is formed of an insulating layer. When a spacing of the shield (a distance between the upper shield layer 54 and the lower shield layer 55 along A–A') is 80 nm, and a first ferromagnetic layer of the above GMR layer is arranged at a position equally spaced from each shield layer, the thicknesses of the upper gap layer 52 and the lower gap layer 53 are approximately 20 nm and 35 nm, respectively. It is difficult to industrially obtain an insulating layer without defects with such a thickness as just mentioned. Therefore, when only about 30V voltage is applied between the shield layer and the magnetoresistive layer 14 due to electrostatic discharges, insulation sometimes breaks down between the upper shield layer 54 and the magnetoresistive layer 14 or the electrode 51, or between the lower shield layer 55 and the magnetoresistive layer 14 or the electrode 51 along A–A' or B–B'. Then, the metal shield layer and the magnetoresistive layer 14 are electrically short-circuited, failing to be normally operated as a head.

However, in the present embodiment, the pair of shield layers 54, 55 are formed of the discontinuous multi-layer or the mixed layer of high resistivity to provide the magnetic shield layers 13, 15. Therefore, even if each of the magnetic shield layers 13, 15 and the magnetoresistive layer 14 in FIG. 1 should be electrically short-circuited, a deterioration in magnetic head performance is low enough. The voltage applied on the upper gap layer 52 or lower gap layer 53 becomes low, because resistivity of the shield layer is high, so that, it is able to make the possibility of the electrostatic discharge low. Therefore, a magnetic head having a high stability is obtained, despite that the shield interval is considerably narrow, 80 nm.

The high temperature heat treatment to a degree more than 250° C. is not necessary in preparing the discontinuous multi-layer. Accordingly, since in the present embodiment, no high temperature heat treatment need be carried out, the thermal deterioration of the GMR layer could be avoided. As a result, it is possible to stably obtain a magnetic head with narrow shield spacing and high output.

[Embodiment 2]

Figure 5:
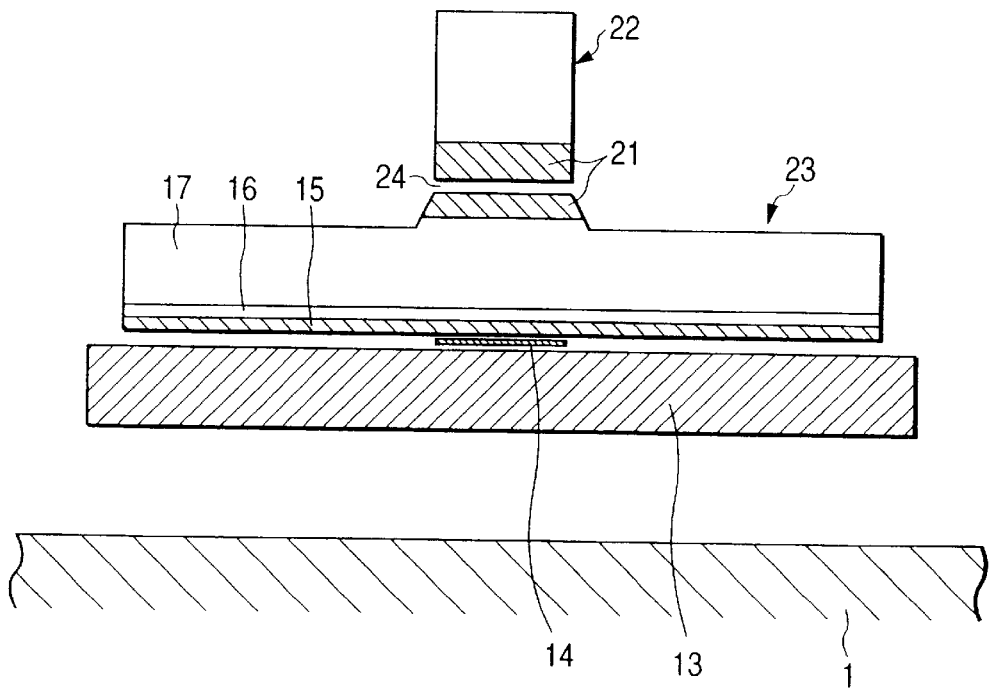
FIG. 5 is an air-bearing surface of a magnetic head according to Embodiment b 2of the present invention.

In Embodiment 1, there is shown an example in which both the upper and lower magnetic shield layers have a thickness of 100 nm. However, alternatively, as shown in FIG. 5, the lower shield layer 13 can be formed of a laminate layer of 1 μm thickness in which a $Co_{90}Fe_{10}$ layer of 1.5 nm thickness and an $Al_2O_3$ layer of 1 nm thickness are laminated alternately. Other arrangements are the same as those of Embodiment 1. In this case, since the number of laminates when a magnetic shield layer is formed increases, the forming process becomes somewhat complicated, but since the radiating efficiency can be enhanced, lamination of the magnetic shield layer with a separate radiating layer is not always necessary. Although the details are omitted, the laminate layer of 1 μm thickness can be used for the upper shield layer.

[Embodiment 3]

Figure 6:
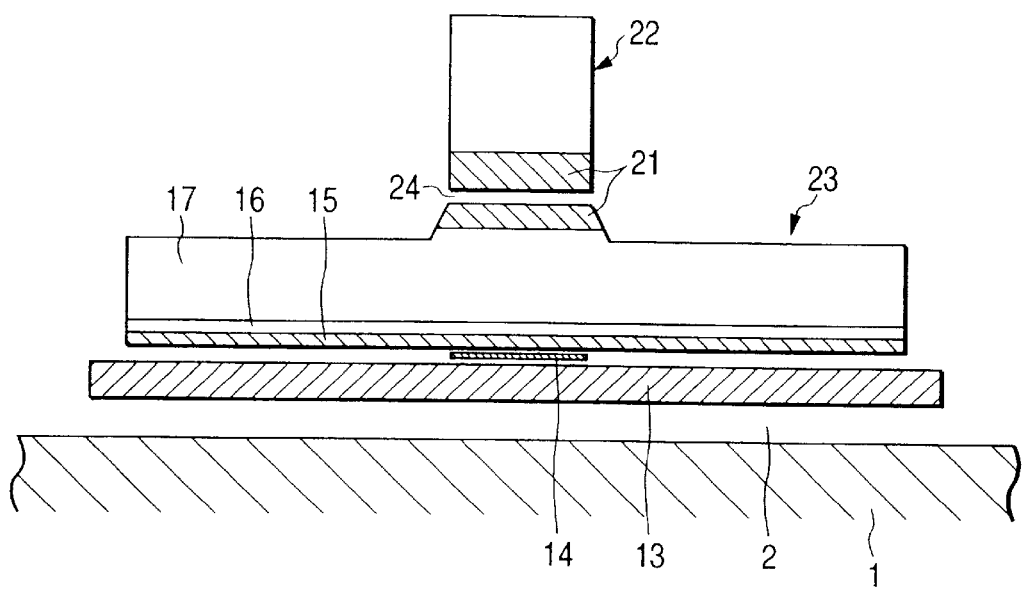
FIG. 6 is an air-bearing surface of a magnetic head according to Embodiment 3 of the present invention.

Alternatively, as shown in FIG. 6, for example, an insulating layer 2 formed of $Al_2O_3$ of 500 nm thickness is formed on the ceramic substrate 1, and a lower shield layer 13 of approximately 300 nm thickness in which a $Co_{90}Fe_{10}$ layer of 1.5nm thickness and a $Al_2O_3$ layer of 1 mm thickness are alternately laminated in contact with the insulating layer 2 can be laminated. Other arrangements are the same as those of Embodiment 1. In this case, heat generated from the magnetoresistive layer 14 by applying a detecting current is diffused through a ceramic substrate 1 which performs the function similar to the lower radiating layer 11 along with an upper radiating layer 17. Therefore, a rise of temperature is suppressed to be low similarly to the above-described Embodiments. In the case of the present embodiment, fine undulations of the ceramic substrate 1 sometimes deteriorate the magnetic characteristic of the magnetoresistive layer 14. Therefore, there is a case where better characteristic can sometimes be obtained by planalizing the surface of the ceramic substrate 1 or the insulating layer 2.

[Embodiment 4]

Figure 7:
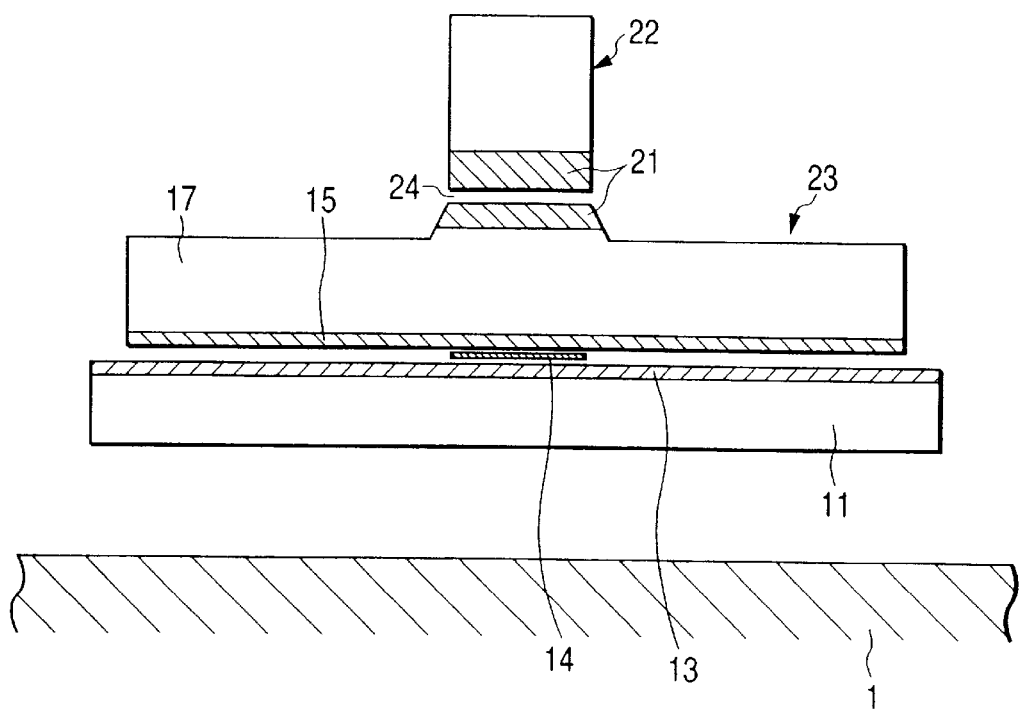
FIG. 7 is an air-bearing surface of a magnetic head according to Embodiment 4 of the present invention.

The resistivity of a mixed layer of a ferromagnetic metal and an insulating material used as a magnetic shield layer, or a discontinuous multi-layer formed by alternately laminating a plurality of ferromagnetic metal layers and a plurality of insulating material layers can be set to 1 mΩ·m or more depending on the selection of materials and the layer forming conditions. In this case (preferably, the resistivity is approximately 10 mΩ·m), the constitution can be employed in which shield layers 13, 15 of 100 nm thickness or more and radiating layers 11, 17 are laminated directly, as shown in FIG. 7. In this case, the radiating efficiency is high, which is advantageous.

[Embodiment 5]

Figure 8:
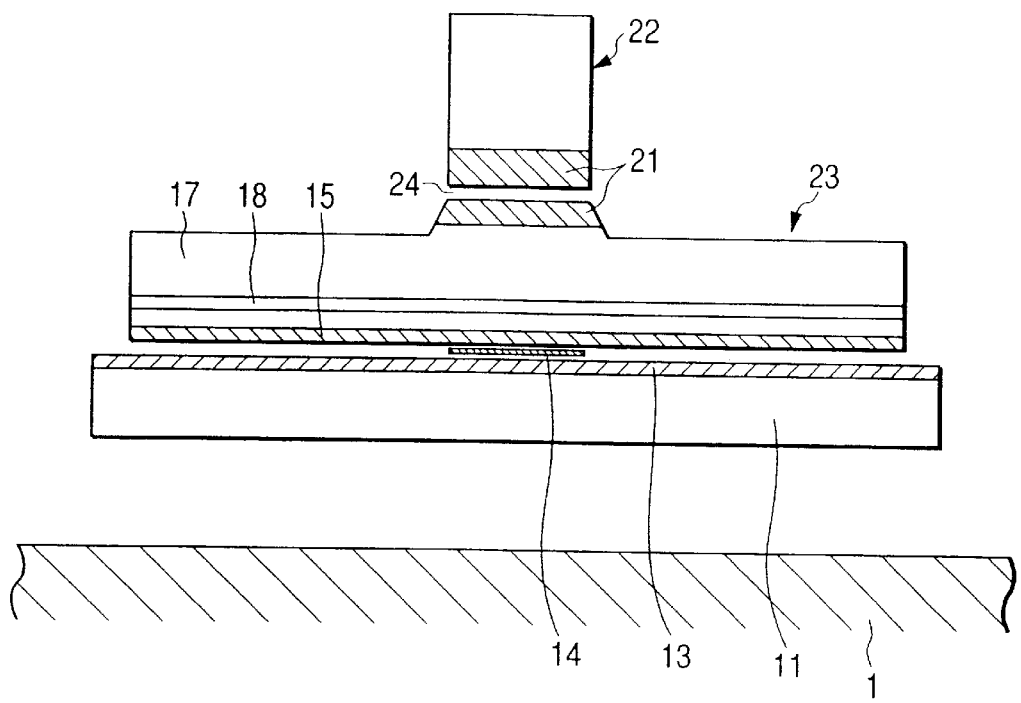
FIG. 8 is an air-bearing surface of a magnetic head according to Embodiment 5 of the present invention.

In the above-described embodiments, a non-magnetic layer formed, for example, of $Al_2O_3$ or Ta of 0.1 to $\mu$m thickness can be inserted into the radiating layer. FIG. 8 shows a case where a non-magnetic layer 18 is inserted into the magnetic head shown in Embodiment 4. Employment of such a constitution as described above can sometimes suppress noises during reproducing operation and variation of reproducing waveform.

[Embodiment 6]

Figure 9:
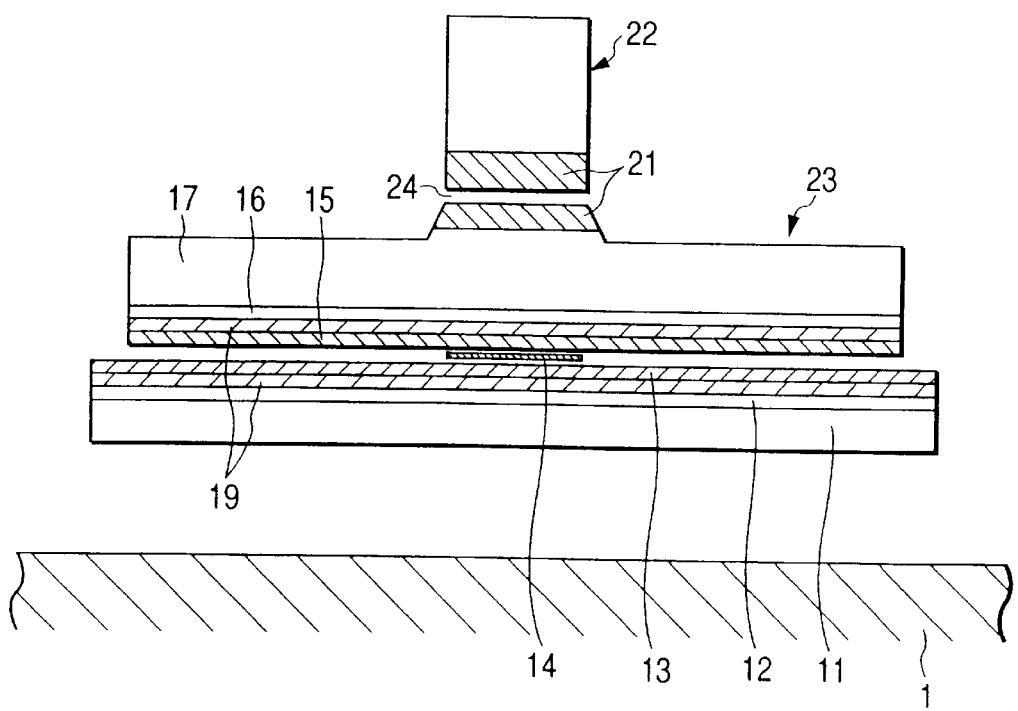
FIG. 9 is an air-bearing surface of a magnetic head according to Embodiment 6 of the present invention.

In the above-described embodiments, a magnetic domain control layer 19 can be arranged in contact with the magnetic shield layers 13, 15. Concretely, arrangement in which a magnetic shield layer and a part or the whole of a laminate surface are laminated in contact, and arrangement in contact with both sides of a magnetic shield layer subjected to patterning can be made. FIG. 9 shows a case where the magnetic domain control layer 19 is arranged to be laminated on the magnetic head shown in Embodiment 1. The domain control layer 19 preferably comprises a magnetic layer whose thickness is as thin as possible and resistivity is as high as possible such as anti-ferromagnetic layer, a permanent magnet layer, or a soft magnetic layer with a large anisotropic magnetic field. The thickness of the domain control layer 19 is preferably not more than 20 nm, and the resistivity is preferably not less than 1 $\mu\Omega \cdot$m. A variety of materials are applicable, but one example thereof is MnPt and CrMnPt. Employment of such a constitution as described above can suppress noises during the reproducing operation and variation of reproducing waveforms more strictly.

[Embodiment 7]

Figure 10:
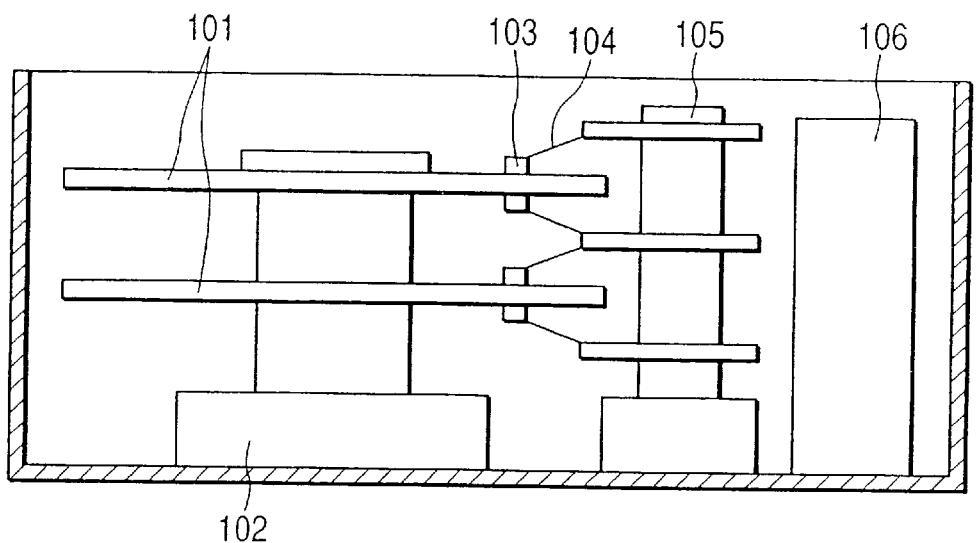
FIG. 10 is a schematic view of a magnetic recording and reproducing apparatus in Embodiment 7 of the present invention.
Figure 11:
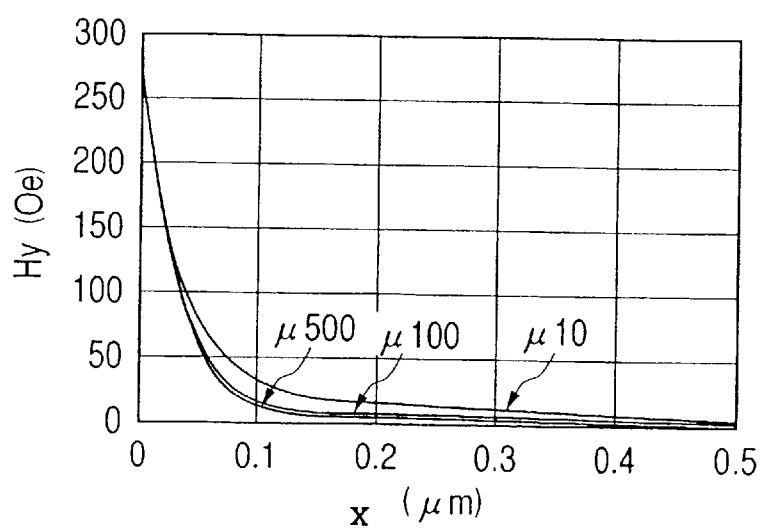
FIG. 11 is a view indicating the shield effect where permeability of a magnetic shield layer is changed.

Use of the magnetic heads shown in the above-described embodiments can realize a magnetic recording apparatus of higher recording density. FIG. 10 schematically shows a magnetic recording and reproducing apparatus according to one embodiment. The magnetic recording and reproducing apparatus comprises a magnetic recording medium 101 for recording information magnetically, a motor 102 for rotating the medium, a magnetic head 103 for recording and reproducing a signal on and from the magnetic recording medium 101, a suspension 104 formed of a resilient member such as a spring for supporting the head, an actuator 105 for positioning the magnetic head 103, and a circuit 106 for processing a recording signal. The magnetic shield layers 13, 15 for constituting the magnetic head 103 have the constitution shown in the above-described embodiments, and the magnetoresistive layer 14 comprises the above-described GMR layer. Therefore, it is possible to stably provide a magnetic head of narrow shield spacing and high output and to incorporate the magnetic head into the apparatus stably without electrostatic discharge damage. As a result, it is possible to stably realize a magnetic recording apparatus of high recording density.

A disk array apparatus can be built by combining a plurality of the magnetic recording and reproducing apparatuses. In this case, since the plurality of magnetic recording and reproducing apparatuses are handled simultaneously, the quick processing ability of information can be attained, and the reliability of apparatus can be improved.

As described above, according to the present invention, since the mixed layer or the discontinuous multi-layer having both the sufficient permeability and the sufficient resistivity are used as the magnetic shield layer, even where the spacing of the shield in the magnetic head is narrowed to cope with the higher recording density, the deterioration in characteristic caused by the short-circuiting between the magnetoresistive layer and the magnetic shield layer can be prevented. Thereby, the magnetic head having the high stability can be provided, and the erroneous operation of the magnetic recording apparatus can be lessened. Further, when or after the magnetic head is incorporated into the magnetic recording and reproducing apparatus, the possibility of the electrostatic discharge damage given to the magnetic head can be reduced, and the magnetic recording apparatus can be operated more stably.

Further, since the high temperature heat treatment is not necessary when the head is fabricated, the GMR layer which is weak in the high temperature heat treatment but has a high sensitivity can be used. Thereby, the magnetic head of narrow shield spacing and high output can be provided stably, and the magnetic recording apparatus of high recording density can be realized.

In the following, the present invention will be compared with the prior art.

The NiZn ferrite material disclosed in Japanese Patent Laid-Open No. 5-266437 is a material well known in that it has a high permeability and a high electrical resistivity in bulk. However, for realizing the high permeability demanded as a magnetic shield layer, in the case of a sputtering layer used generally, a high temperature heat treatment at approximately 500 to 1000° C. is necessary. Therefore, where this layer is used particularly for an upper shield layer, the characteristic of the magnetoresistive layer is deteriorated during the heat treatment, often failing to operate normally as a head. In particular, the GMR layer which begins to deteriorate at approximately 300° C. is greatly affected thereby. Further, in the magnetic shield layers disclosed in Japanese Patent Laid-Open No.11-86234 or Japanese Patent Laid-Open No. 8-147634,a shield layer can be manufactured by heat treatment at a temperature of 300° C. or less depending on the selection of materials and the manufacturing conditions, but only resistivity of at most 200 $\mu\Omega\cdot$cm (0.002 m$\Omega\cdot$m) is obtained. This seems to result from the construction of the magnetic shield layer. That is, it is considered that due to the construction in which a continuous layer of ferromagnetic metal and a continuous layer of an insulating compound are laminated sequentially, the resistivity cannot be made large sufficiently.

According to the present invention, even where the shield spacing is narrowed, it is possible to prevent the deterioration in characteristic of the magnetic head caused by the shortcircuiting between the magnetoresistive layer and the magnetic shield. Therefore, the magnetic recording and reproducing apparatus of high recording density can be realized.

For better understanding the drawings, main reference numerals are described below:

2: insulating layer, 10: reproducing element, 11: lower radiating layer, 12: insulating layer, 13: lower shield layer, 14: magnetoresistive layer, 15: upper shield layer, 16: insulating layer, 17: upper radiating layer, 18: non-magnetic layer, 19: magnetic domain control layer, 20: recording element, 21: high saturation magnetic flux density layer, 22: upper core, 23: lower core, 24: recording gap, 51: electrode, 52: upper gap layer, 53: lower gap layer, 54: upper shield layer, 55: lower shield layer, 61: ferromagnetic metal, 62: insulating material, 101: magnetic recording medium, 102: motor, 103: recording and reproducing head, 104: suspension, 105: actuator, 105: signal processing circuit.

What is claimed is:

1. A magnetic head including a pair of magnetic shield layers, a pair of gap layers formed between said pair of magnetic shield layers, a magnetoresistive layer arranged between said pair of gap layers, and a pair of electrodes electrically connected to said magnetoresistive layer wherein at least one of said pair of magnetic shield layers comprise a discontinuous multi-layer which includes islands of ferromagnetic material separated by insulating material.

2. The magnetic head according to claim 1, wherein said ferromagnetic metal comprises an alloy including cobalt, an alloy including nickel or an alloy including iron, and said insulating material includes oxide of aluminum or silicon, nitride of aluminum or silicon, carbide of aluminum or silicon, boride of aluminium or silicon, or boron nitride.

3. The magnetic head according to claim 1, wherein said ferromagnetic metal comprises an alloy containing cobalt and iron, and said insulating material contains oxide of aluminum.

4. The magnetic head according to claims 1 to 3, wherein the electrical resistivity of the magnetic shield layer formed of said discontinuous multi-layer is not less than 0.1 mΩ·m.

5. The magnetic head according to claim 1, wherein the permeability of the magnetic shield layer formed of said discontinuous multi-layer is not less than 100.

6. A magnetic head including a pair of magnetic shield layers, a pair of gap layers formed between said pair of magnetic shield layers, a magnetoresistive layer arranged between said pair of gap layers, and a pair of electrodes electrically connected to said magnetoresistive layer, wherein at least one of said pair of magnetic shield layers comprise a mixed layer which includes particles ferromagnetic material surrounded by insulating material.

7. The magnetic head according to claim 6, wherein said ferromagnetic metal comprises an alloy containing cobalt and iron, and said insulating material contains oxide of aluminum.

8. The magnetic head according to claim 6, wherein said ferromagnetic metal comprises an alloy including cobalt, an alloy including nickel or an alloy including iron, and said insulating material includes oxide of aluminum or silicon, nitride of aluminum or silicon, carbide of aluminum or silicon, boride of aluminium or silicon, or boron nitride.

9. The magnetic head according to claims 6 to 8, wherein the electrical resistivity of the magnetic shield layer formed of said mixed layer is not less than 0.1 mΩ·m.

10. The magnetic head according to claim 9, wherein the permeability of the magnetic shield layer formed of said mixed layer is not less than 100.

11. The magnetic head according to claim 6, wherein said magnetoresistive layer comprises a laminate layer formed in order of a first ferromagnetic layer, a non-magnetic conductive layer, a second ferromagnetic layer, and an anti-ferromagnetic layer.

12. (amended) The magnetic head according to claim 6, wherein said magnetoresistive layer comprises a laminate layer having a first ferromagnetic layer of which the magnetization direction changes with an external magnetic field, a second ferromagnetic layer of which the magnetization direction is almost fixed with respect to the external magnetic field, and a non-magnetic conductive layer formed between said first ferromagnetic layer and said second ferromagnetic layer.

13. A magnetic recording and reproducing apparatus comprising:

a magnetic recording medium for magnetically recording information; and a magnetic head having:
a pair of magnetic shield layers,
a pair of gap layers formed between said pair of magnetic shield layers,
a magnetoresistive layer formed between said pair of gap layers, and constituted by a laminate layer formed in order of a first ferromagnetic layer, a non-magnetic conductive layer, a second ferromagnetic layer, and an anti-ferromagnetic layer, and
a pair of electrodes electrically connected to said magnetoresistive layer,
wherein at least one of said pair of magnetic shield layers comprise a discontinuous multi-layer which includes islands of ferromagnetic material separated by insulating material.

14. A magnetic recording and reproducing apparatus comprising:

a magnetic recording medium for magnetically recording information; and a magnetic head having:
a pair of magnetic shield layers,
a pair of gap layers formed between said pair of magnetic shield layers,
a magnetoresistive layer formed between said pair of gap layers, and constituted by a laminate layer having a first ferromagnetic layer of which the magnetization direction changes with a magnetic field leaking from said magnetic recording medium, a second ferromagnetic layer of which the magnetization direction is almost fixed with respect to the magnetic field leaking from said magnetic recording medium, and a non-magnetic conductive layer formed between said first ferromagnetic layer and said second ferromagnetic layer,
a pair of electrodes electrically connected to said magnetoresistive layer, and
wherein at least one of said pair of magnetic shield layers comprise a discontinuous multi-layer which includes islands of ferromagnetic material separated by insulating material.

* * * * *